W. WENK.
WHISKING MACHINE.
APPLICATION FILED AUG. 11, 1909.

966,501.

Patented Aug. 9, 1910.

3 SHEETS—SHEET 1.

Witnesses  Inventor
Wilhelm Wenk
by
Att'y

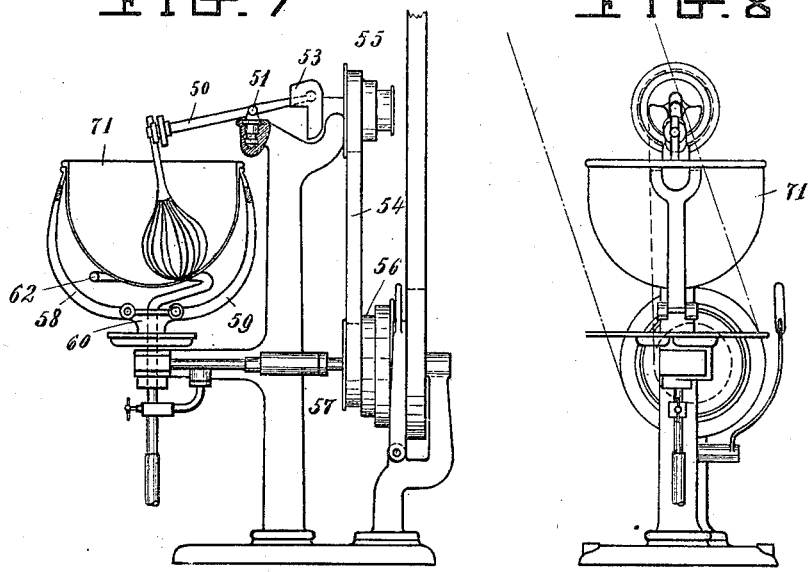
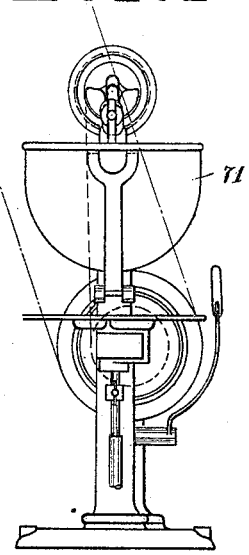
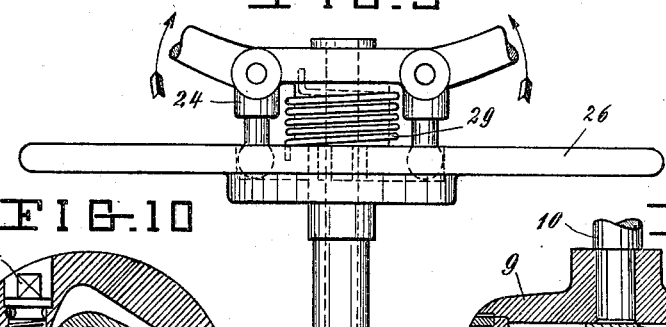
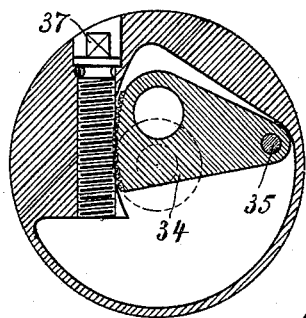
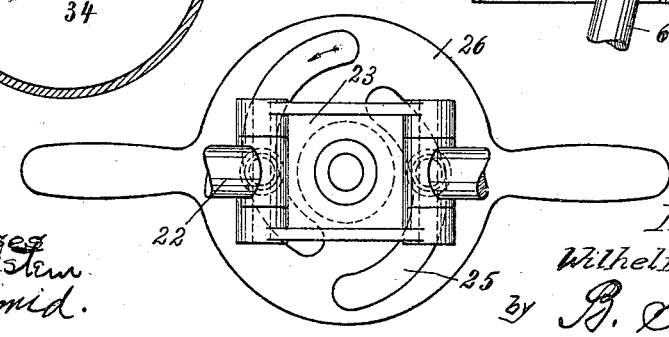

W. WENK.
WHISKING MACHINE.
APPLICATION FILED AUG. 11, 1909.

966,501.

Patented Aug. 9, 1910.
3 SHEETS—SHEET 3.

Witnesses
R. Hornstein
M. Schmid

Inventor
Wilhelm Wenk
By J. Singer
Atty

UNITED STATES PATENT OFFICE.

WILHELM WENK, OF OLTEN, SWITZERLAND, ASSIGNOR TO FIRM "PERFECT"
A. G. FÜR MASCHINENBAU BASEL AT BASLE.

WHISKING-MACHINE.

966,501.  Specification of Letters Patent.  Patented Aug. 9, 1910.

Application filed August 11, 1909. Serial No. 512,463.

*To all whom it may concern:*

Be it known that I, WILHELM WENK, of Olten, Switzerland, manufacturer, have invented new and useful Improvements in Whisking-Machines, of which the following is a specification.

This invention relates to a whisking machine in which the whisk, on the rotation of the pan, describes a path similar to that which a whisk suitably operated by hand describes. Similar appliances in which the pan executes a rotary motion on the movement of the whisk, are known.

The novelty of the improved machine consists in the fact that the whisk executes a double movement for the attainment of which various means may be employed.

Compared with the heretofore known constructions of such machines the improved machine further differs in that the pan is held by adjustable jaws and in such a way moreover that pans of various sizes can be automatically held by the same jaws.

The accompanying illustrative drawings show constructions of machines embodying this invention.

Figures 1, 2:
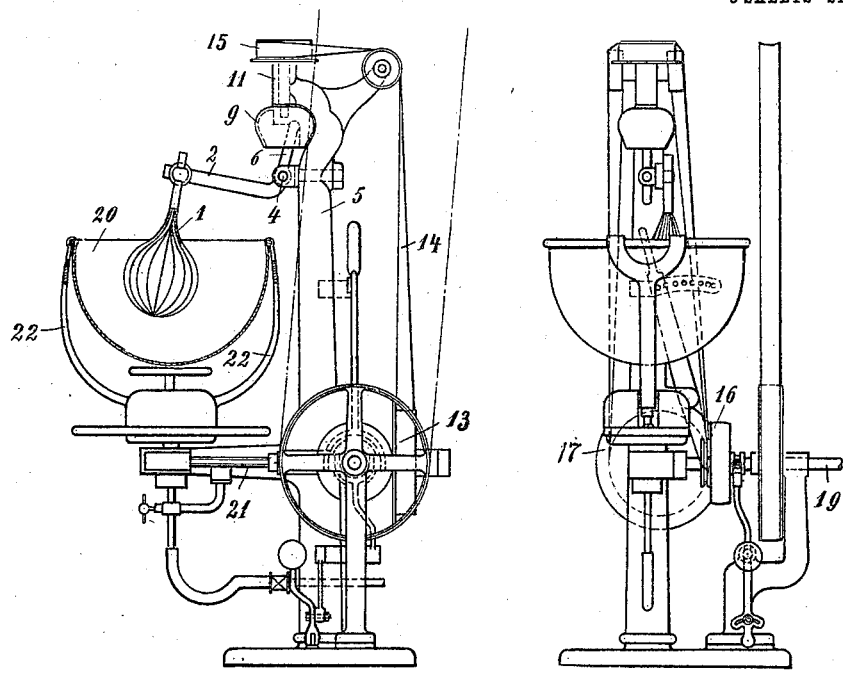
Figures 3, 4, 5:
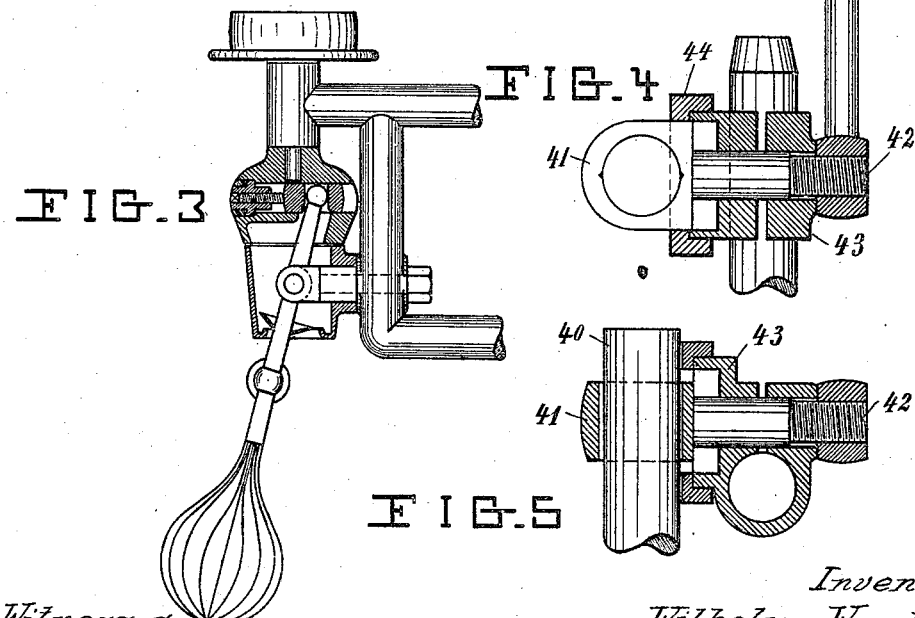
Figure 12:
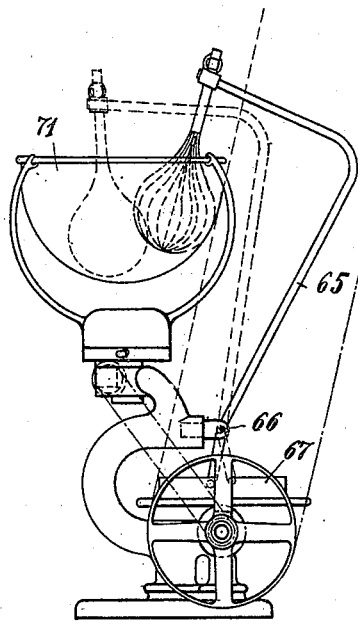
Figure 13:
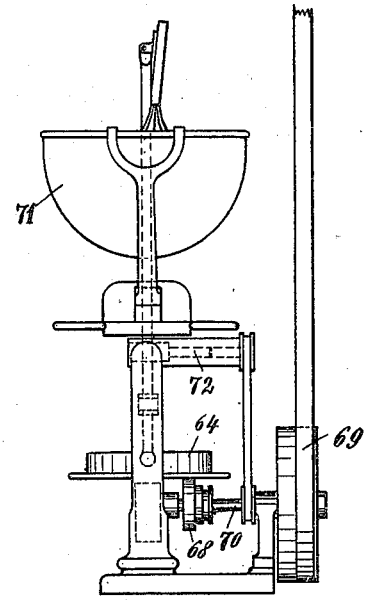

Figure 1 is a side view partially in section showing one such construction. Fig. 2 is a front view. Fig. 3 shows a modified form of construction. Figs. 4 to 6 are detail views of parts shown in section. Figs. 7 and 8 are similar views to Figs. 1 and 2 illustrating another construction of the improved machine. Figs. 9, 10 and 11 illustrate further details. Figs. 12 and 13 are also similar views to Figs. 1 and 2 showing another construction of machine and Figs. 14 and 15 each illustrate yet other constructions.

The whisk 1 is attached to one arm 2 of a bell crank lever 2—6 which is pivotally mounted upon a pin 4. The pin 4 is horizontally arranged and is pivotally mounted in the standard 5 of the machine. The end of the other arm 6 of the bell-crank lever is spherical in form and is pivotally arranged in a bearing 8 Fig. 6, which is movable in the direction of its length in a disk 9. The disk 9 is attached to a vertical shaft 10 which is carried in a bearing 11 on the standard 5 and is driven from a driving pulley 13 by means of a belt 14 and belt pulley 15. The pulley 13 is driven at any desired speed from a counter shaft 19 through friction wheels 16 and 17 one of which is adjustable.

20 is the machine pan which is rotated by means of a worm and worm wheel from the shaft 21. This pan is interchangeable and is held by two jaws 22 which are mounted to rotate about a piece 23 which is pivotally mounted on the standard 5. Each jaw 22 is rigidly connected to levers 24 which engage slots in a disk 26 that is pivotally arranged on the bearing piece 23 and can be rotated thereon by means of a hand lever. The slots 25 are so arranged that when the disk 26 is moved the jaws are swung outwardly and between the bearing piece 23 and the disk 28 is placed a torsion spring 29 which tends to move the disk in such a way that the jaws are pressed against the pan.

To move the bearing 8 in a radial direction an arrangement like that shown in Fig. 6 for example may be used. In the disk 9 is formed a slot 30 in which the bearing can be moved by means of a screw 31 and nut 32. The nut 32 is prevented from moving axially and is easily accessible from the exterior of the disk. Instead of this arrangement an arrangement like that shown in Fig. 11 may be used. In this construction the bearing is formed in a segment 34 which is mounted to rotate upon a pin 35 on the disk. The segment is moved by a screw 37 which is prevented from moving axially and can be actuated from the exterior of the disk.

The attachment of the whisk to the lever is preferably effected by means of the appliance shown in Figs. 4 and 5.

The stem 40 of the whisk is movable in the eye 41 of a bolt 42 which is pivotally mounted in a sleeve 43 provided on the arm 2 of the lever 2—6. The sleeve 43 is movable on such lever and can be clamped fast thereon in such way that the stem 40 is simultaneously clamped fast relatively to the bearing piece 44 which is rotatably arranged upon the sleeve. The whisk can accordingly be set in various oblique positions by means of a single lever.

Fig. 3 shows another construction in which the lever 2—6 carrying the whisk is a straight one and is arranged approximately vertical so that the curve followed by the whisk is approximately horizontal in direction, in this arrangement.

In the construction shown in Figs. 7 and 8 the lever 50 carrying the whisk is arranged to rotate vertically upon a pin 51 and is driven from a disk 53 which is fixed upon a horizontal shaft. The disk 53 is driven by means of a belt 54 and stepped pulleys 55, 56 from a shaft 57 which also drives the bearing piece 60 carrying the jaws 58, 59 so that the pan is carried along with it. The pan can be heated by a heating pipe 62. By the rotation of the disk 55 the whisk receives a double movement, which corresponds to that of a whisk when suitably moved by hand. As the pan rotates continuously during this movement of the whisk the entire contents of the pan are operated upon uniformly.

The machine may be provided with a clutch adapted to be thrown out of action and the driving may likewise be effected by electric motor if desired.

In the construction shown in Figs. 12 and 13 the lever 65 carrying the whisk is mounted to rotate horizontally upon a pin 66 and is driven from a horizontal disk 67 which at the same time is constructed as a friction disk and is mounted directly over the friction wheel 68 on the shaft 70 driven by the belt pulley 69. The pan 71 is driven by means of a worm and worm wheel from the shaft 72 which is driven from the shaft 70.

Figure 14:
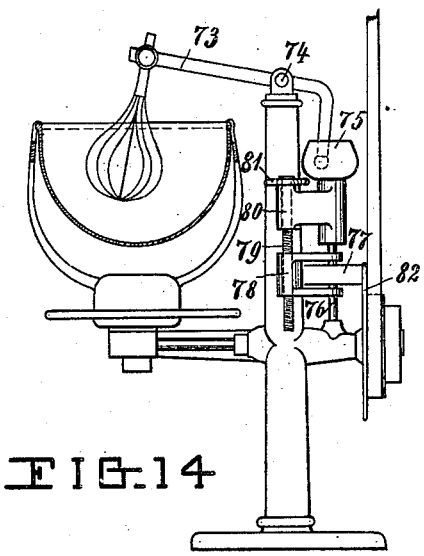

In the construction shown in Fig. 14 a bell crank lever 73 carrying the whisk is arranged to rotate horizontally upon a pin 74 and the other, spherically shaped end, of the bell crank lever 73 is pivotally mounted in a horizontal disk 75 which is driven from a shaft 76 upon which a friction wheel 77 is arranged to move axially. The movement of the friction wheel is effected by means of a fork 78 which is mounted on a spindle 79 that is pivotally mounted in a support 80. On the upper end of the spindle 79 is keyed a hand wheel 81 by the rotation of which the fork 78 and with it the friction wheel 77 can be adjusted in any desired manner. The friction wheel 77 is driven from the friction disk 82, which is at the same time made in the form of a belt pulley.

Figure 15:
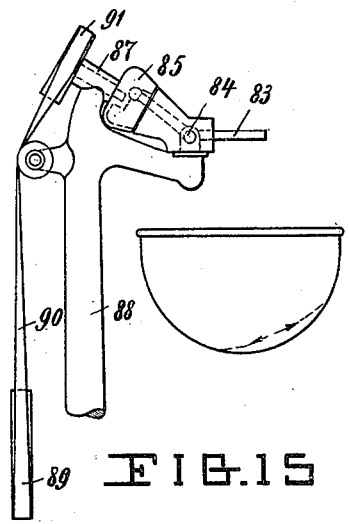

In Fig. 15 a bell crank lever 83 carrying the whisk is arranged to rotate upon a horizontal pin 84, while the spherically shaped end of the bell-crank lever 83 is pivotally mounted in a disk 85 inclined to the horizontal. The disk 85 is fixed upon a shaft 86 inclined to the vertical and which is mounted in a bearing 87 on the machine standard 88 and driven from a disk 89 by means of a belt 90 and pulley 91.

The details of construction can be other than shown without departure from the invention.

Having now particularly described and ascertained the nature of the said invention and in what manner the same is to be performed I declare that what I claim is:—

1. A whisking machine comprising in combination, a pan, a whisk or beater projecting into said pan, means for actuating said whisk, mechanism for rotating said pan including a support comprising pivotally mounted levers engaging the pan with their upper ends, and a disk provided with eccentric slots engaging the opposite ends of said levers to adjust the same for different sized pans.

2. A whisking machine comprising in combination, a pan, a whisk or beater projecting into said pan, means for actuating said whisk or beater, mechanism for rotating said pan including a support comprising pivotally mounted levers engaging the pan with their upper ends, a rotatably mounted disk having slots eccentric to its axis of rotation for engagement with the opposite ends of said lever to adjust the same for different sized pans, and a spring engaging said disk and moving the same in a direction to contract the upper ends of said levers.

3. A whisking machine comprising in combination, a pan, a whisk or beater projecting into said pan, means for actuating said whisk, and a support for said pan comprising pivotally mounted levers engaging the pan with their upper end, and a disk provided with eccentric slots for engaging the opposite ends of said levers to adjust the same to different sized pans and for permitting removal and insertion of the pan.

4. A whisking machine comprising in combination, a pan, a whisk or beater projecting into said pan, means for actuating said whisk, a support for said pan comprising pivotally mounted levers engaging said pan, and rotatable eccentric means for controlling said levers, substantially as and for the purpose set forth.

5. A whisking machine comprising in combination, a pan, a whisk or beater projecting into said pan, means for actuating said whisk, mechanism for rotating said pan including a support comprising pivotally mounted levers engaging said pan, and rotatable means for controlling said levers, substantially as and for the purpose set forth.

6. A whisking machine comprising in combination, a pan, a whisk or beater projecting into said pan, means for actuating said whisk, mechanism for rotating said pan including a support comprising pivotally mounted arms or levers engaging said pan, and spring actuated means normally holding said levers in engagement with said pan.

7. A whisking machine comprising in combination, a pan, a whisk or beater projecting into said pan, a horizontally disposed pivot supporting said whisk, rotatable means for operating said whisk comprising a shell having a passage at right angles to its axis of rotation, and an adjusting device in said passage for adjusting said whisk radially with respect to such axis to vary the movement of said whisk.

8. A whisking machine comprising in combination, a pan, a whisk or beater projecting into said pan, a bell crank lever having one arm connected with said whisk, a pivot supporting said bell crank lever, a rotatable shell surrounding the other arm of said bell crank lever and provided with a passage at right angles to its axis of rotation, and an adjustable device in said passage engaging said bell crank lever to move the same radially, substantially as and for the purpose set forth.

In testimony whereof I affix my signature in presence of two witnesses.

WILHELM WENK.

Witnesses:
  GEORGE GIFFORD,
  ARNOLD T. ZUBER.